(12) United States Patent
Caval

(10) Patent No.: US 6,790,276 B1
(45) Date of Patent: Sep. 14, 2004

(54) FORMULA FOR PLASTER

(76) Inventor: Jacob Caval, 3798 N. 2500 East, Twin Falls, ID (US) 83301

( * ) Notice: Subject to any disclaimer, the term of this patent is extended or adjusted under 35 U.S.C. 154(b) by 0 days.

(21) Appl. No.: 10/712,908

(22) Filed: Nov. 12, 2003

(51) Int. Cl.[7] .......................... C04B 11/00; C04B 28/14
(52) U.S. Cl. ...................... 106/777; 106/772; 106/791; 106/792; 106/800; 106/801
(58) Field of Search ................................ 106/772, 777, 106/791, 792, 800, 801

(56) References Cited

U.S. PATENT DOCUMENTS

| | | |
|---|---|---|
| 1,424,908 A | 8/1922 | Isaacs |
| 2,163,207 A | 6/1939 | Missotten |
| 2,239,925 A | 4/1941 | McKee et al. |
| 2,833,660 A * | 5/1958 | Busatti ................. 106/649 |
| 2,868,660 A * | 1/1959 | Lemmon ................. 106/666 |
| 2,868,752 A | 1/1959 | Frazier et al. |
| 3,121,702 A | 2/1964 | Sherr et al. |
| 3,256,223 A | 6/1966 | Heijmer |
| 3,905,826 A | 9/1975 | Ordonez et al. |
| 3,947,398 A | 3/1976 | Williams |
| 3,977,889 A | 8/1976 | Shearing |
| 4,049,465 A | 9/1977 | Dwyer |
| 4,094,829 A | 6/1978 | Shearing |
| 4,157,264 A | 6/1979 | Kennedy-Skipton |
| 4,211,680 A | 7/1980 | Shearing |
| 4,286,995 A | 9/1981 | Smith et al. |
| 4,293,344 A | 10/1981 | Joseph |
| 4,306,911 A | 12/1981 | Gordon et al. |
| 4,708,745 A | 11/1987 | Schonhausen |
| 4,946,715 A | 8/1990 | Avera |
| 5,075,358 A | 12/1991 | Riley et al. |
| 5,084,303 A | 1/1992 | Avera |
| 5,122,395 A | 6/1992 | Sandor |
| 5,254,228 A | 10/1993 | Westhof et al. |
| 5,277,712 A | 1/1994 | McInnis |
| 5,366,600 A | 11/1994 | Westhof et al. |
| 5,501,819 A | 3/1996 | Westhof et al. |
| 5,741,844 A | 4/1998 | Nass et al. |
| 6,063,856 A | 5/2000 | Mass |

* cited by examiner

Primary Examiner—C. Melissa Koslow
Assistant Examiner—Shalie Manlove
(74) Attorney, Agent, or Firm—Robert L. Shaver; Dykas, Shaver & Nipper

(57) ABSTRACT

A plaster formulation for forming a non-shinny, slow-drying plaster, in which color may be blended and multiple color coats applied to form a colored surface with the appearance of depth, age, and texture.

5 Claims, No Drawings

FORMULA FOR PLASTER

BACKGROUND OF THE INVENTION

1. Field of the Invention

The present invention generally relates to plaster formulations, and more particularly relates to plaster formulations for mixing color and applying it to the interior walls of houses.

2. Background Information

The present plaster formulations, which are commercially available, have several deficiencies. When applied to the interior walls of houses, current plaster formulations are typically too shinny. People would prefer a plaster that is less shinny. The current formulations scratch too easily, which is undesirable for the workman preparing the surface and also for the homeowner. The biggest problem with current formulations is that all work with the web plaster must be done fairly quickly, because the plaster sets within about forty minutes. What would be preferable is to have more time in which to apply different layers of plaster with different colors. The different layers with different shades of colors result in an attractive effect on the wall.

Another problem with current formulations of plaster, is that they may contain chemicals that are undesirable in a home. More and more people are becoming allergic to various chemicals in the environment. It would be very desirable to have a plaster that did not contain strong fumes, acidic fumes, and in which glues of various types or complex chemicals are not utilized.

SUMMARY OF THE INVENTION

These and other objects are accomplished by the plaster formulation of the invention. The plaster formulation of the invention utilizes Keene's cement as one of its ingredients. J. D. Greenwood and R. W. Keene patented Keene's cement in 1838. It is a type of interior wall plaster that is obtained primarily from gypsum, which is heated above 170° C. to form a hydrous calcium sulfate. This is soaked in a solution of alum (potassium aluminum sulfate) to accelerate the set. The mixture is then reheated to 400°–500° C. and ground to form a plaster.

Mixed with Keene's cement is crystalline silica. Other ingredients include dolomitic hydrated lime and calcium carbonate. These are mixed together with water to form plaster.

A cement that is considered to be equivalent to Keene's cement, for the purpose of this formula, is Parian cement. J. Keating patented Parian cement in 1846. As is Keene's cement, Parian cement is a hard finish plaster. It is prepared in a manner similar to Keene's cement, except borax is used as an additive to finely powdered gypsum in place of the alum, which is used in Keene's cement. To make Parian cement, Plaster of Paris is soaked in a solution of borax (sodium borate), cream of tarter (potassium hydrogen tartrate), and in water and subsequently calcined. Synonyms for Parian cement are gypsum cement and hard finish plaster. Although, the formula for the plaster of the invention specifies Keene's cement, it is intended that that term cover both Keene's and Parian cement.

DESCRIPTION OF THE PREFERRED EMBODIMENTS

The preferred embodiment of the invention includes cement; preferably Keene's cement but Parian cement could also be an equivalent, crystalline silica, dolomitic hydrated lime, calcium carbonate, and water. These are mixed together to form a composition of plaster that is supplied to walls. This would typically be mixed with color and various coats of this colored plaster composition can be applied to walls. By applying several thin layers of colored plaster, improved color effects can be achieved over a single coat of colored plaster. Such multiple applications of colored coats of plaster gives the effect of depth and texture, which is desirable when combined with the non-shinny nature of the surface, formed by the formulation of the invention.

Although, various combinations of these ingredients fall within the claimed invention, a preferred range of ingredients is to utilize 16–22 parts Keene's cement; 20–26 parts crystalline silica; 3–5 parts dolomitic hydrated lime; 0.5 to 5 parts calcium carbonate, and 1.5 to 2.5 parts water. Water should be added until the desired consistency is achieved, this is just an approximate value.

A specific combination, which is presently preferred, is to utilize 19 parts of Keene's cement, 23 parts of crystalline silica, 4 parts of dolomitic hydrated lime, 1 part of calcium carbonate, and 2 parts of water. When mixed together, this formulation results in a plaster compound that takes about six hours to harden. During this time, various color blends can be made and applied in layers. By applying it in layers, the color coats result in a textured, antiqued, or classical surface that has the appearance of age. This cannot be achieved with plasters currently on the market, which set in forty minutes and do not give enough time to blend colors and apply various color coats. The plaster of the present formulation also results in a surface that is not shinny. It is also comprised of mineral components, which is desirable because it does not produce heavy fumes or chemicals which are not desired inside buildings.

I claim:

1. A dry plaster formulation for mixing with water to form a slow drying plaster for use as a color carrier for blending colors, comprising, by dry weight:

16–22 parts Keene's cement
   20–26 parts crystalline silica
   3–5 parts dolomitic hydrated lime; and
   0.5 to 5 parts calcium carbonate.

2. A dry plaster formulation for mixing with water to form a slow drying plaster for use as a color carrier for blending colors, comprising, by dry weight:

19 parts Keene's cement
   23 parts crystalline silica
   3–5 parts dolomitic hydrated lime; and
   0.5 to 5 parts calcium carbonate.

3. A composition, which is the product obtained by mixing together Keene's cement, crystalline silica, dolomitic hydrated lime, calcium carbonate, and water.

4. A composition as claimed in claim 3, which contains 16–22 parts Keene's cement; 20–26 parts crystalline silica; 3–5 parts dolomitic hydrated lime; 0.5 to 5 parts calcium carbonate, and 1.5 to 2.5 parts water.

5. A composition as claimed in claim 3, which contains approximately 19 parts Keene's cement; 23 parts crystalline silicia; 4 parts dolomitic hydrated lime; 1 part calcium carbonate, and 2 parts water.

* * * * *